United States Patent [19]

Shiroyama et al.

[11] Patent Number: 5,400,951

[45] Date of Patent: Mar. 28, 1995

[54] METHOD OF BRAZING A JOINT PORTION OF AN INTAKE MANIFOLD WITH PREPLACED BRAZING

[75] Inventors: Michio Shiroyama; Takeshi Otsubo; Minobu Sukimoto; Shoichi Sato; Seiji Tazaki; Tadashi Usui, all of Oyama, Japan

[73] Assignee: Showa Aluminum Corporation, Sakai, Japan

[21] Appl. No.: 113,953

[22] Filed: Aug. 31, 1993

[51] Int. Cl.[6] .............. B23K 33/00; F02M 35/10; F16L 13/08
[52] U.S. Cl. .................. 228/168; 228/258; 29/890.052; 285/287
[58] Field of Search .......... 228/168, 169, 174, 258, 228/262.51; 29/890.052, DIG. 4; 285/287; 123/52 MC

[56] References Cited

U.S. PATENT DOCUMENTS 3,680,200  8/1972  Terrill et al. ............... 285/287 X
4,887,557 12/1989  Sukimoto et al. ........... 123/52 MC
5,101,889  4/1992  Potier ........................ 285/287 X

FOREIGN PATENT DOCUMENTS

3413999 11/1985 Germany .
56-114596 9/1981 Japan .
468749 7/1937 United Kingdom ............... 285/287

Primary Examiner—P. Austin Bradley
Assistant Examiner—Jeanne M. Elpel
Attorney, Agent, or Firm—Armstrong, Westerman, Hattori, McLeland & Naughton

[57] ABSTRACT

In brazing a first metal piece having a tubular joint portion of predetermined length at an end thereof and a second metal piece having a bore for inserting the extremity of the joint portion thereinto by replaced brazing with the extremity of the joint portion inserted in the bore, a plurality of axial grooves having a depth of 0,3 to 1,5 mm and arranged at a spacing of 5 to 30 mm in the circumferential direction are formed in the outer peripheral surface of joint portion of the first metal piece. Each of the grooves has one end extending to the outside of the bore of the second metal piece when the joint portion is inserted in the bore. The gas or residue of flux produced during brazing escapes through the grooves, whereby voids or like defects are prevented from occurring in the fillet of the brazed joint. Since the grooves are all filled up with the brazing filler metal, the brazed joint is given a sufficient bond strength and prevented from permitting leakage there-through.

10 Claims, 10 Drawing Sheets

METHOD OF BRAZING A JOINT PORTION OF AN INTAKE MANIFOLD WITH PREPLACED BRAZING

BACKGROUND OF THE INVENTION

The present invention relates to a method of brazing metal pieces, and more particularly to a method of brazing a first metal piece having a tubular joint portion of predetermined length at an end thereof and a second metal piece having a circular bore for inserting thereinto the extremity of the joint portion of the first metal piece by preplaced brazing with the joint portion extremity of the first metal piece inserted in the bore of the second metal piece, for use in preparing intake manifolds for motor vehicles, heat exchangers, etc.

The term "aluminum" as used herein and in the appended claims includes pure aluminum and aluminum alloys. Further the term "bore" as used herein and in the appended claims includes a through bore and a bore closed at one end.

PRIOR ART

Figure 10:
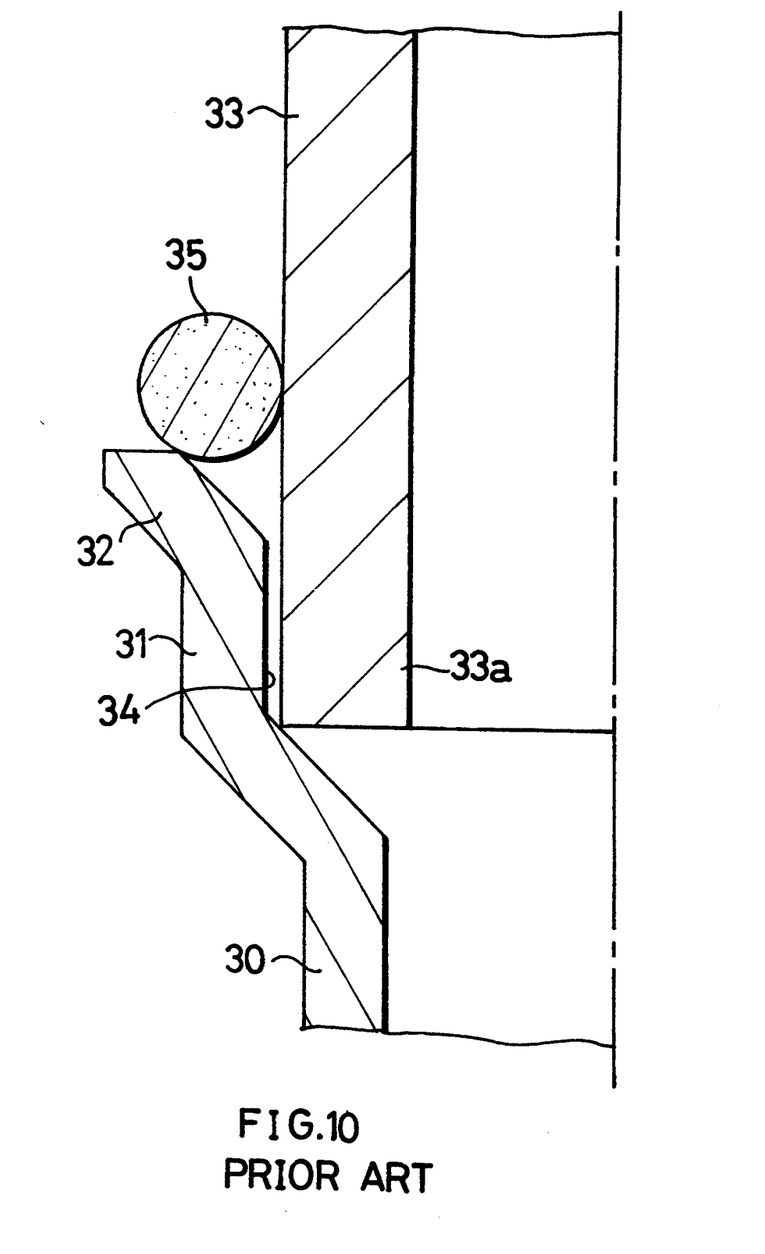
FIG. 10 is an enlarged view in vertical section showing a metal pipe and a cylindrical metal part before brazing by a conventional method.

For example, a metal pipe of a circular cross section having a joint portion of a predetermined length at an end thereof is usually joined to a tubular metal part having a circular bore for inserting the extremity of the joint portion of the metal pipe thereinto by preplaced brazing in the following manner. With reference to FIG. 10, an enlarged tubular portion 31 of predetermined length is first formed in a cylindrical metal part 30 at an open end thereof, and a flare 32 is formed at the extremity of the enlarged tubular portion 31. The inner surface of the enlarged tubular portion 31 defines a circular bore 34 for inserting the extremity of a joint portion 33a of one end of a metal pipe 33 thereinto. Subsequently, a piece of brazing filler metal 35 having a circular cross section and an outside diameter larger than the inside diameter of the diametrically largest portion of the flare 32 is fitted around the portion 33a of the metal pipe 33 to be joined to the metal part 30, and the extremity of the joint portion 33a of the metal pipe 33 is inserted into the circular bore 34. The joint is then heated in the atmosphere or in a nitrogen gas atomosphere within a furnace using a flux to braze the joint.

Figure 11:
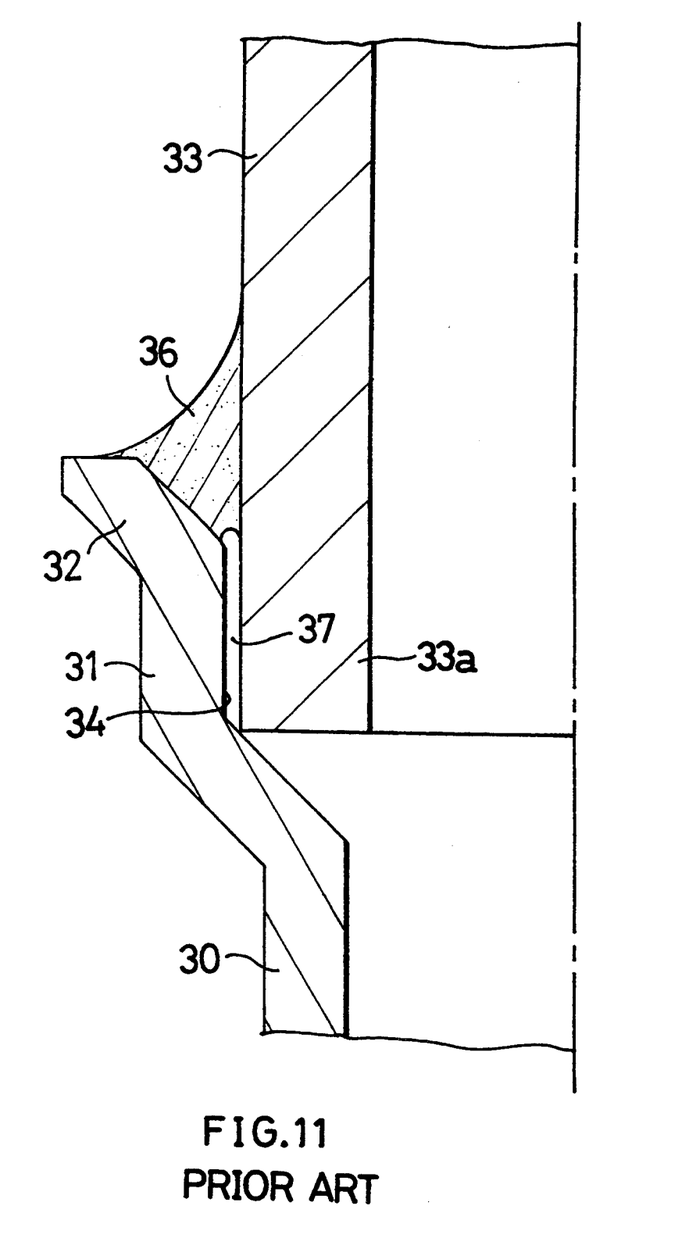
FIG. 11 is an enlarged view in vertical section of the metal pipe and the metal part as brazed by the conventional method shown in FIG. 10.

When the joint is brazed by the conventional method, however, a gas produced during brazing or a residue of the flux forms a void 37 in the fillet 36 of the brazed joint as shown in FIG. 11, giving rise to the problem that the brazed joint fails to exhibit the desired bond strength and permits a leak.

SUMMARY OF THE INVENTION

An object of the present invention is to provide a method of brazing metal pieces free of the above problem.

In brazing a first metal piece having a tubular joint portion of predetermined length at an end thereof and a second metal piece having a bore for inserting the extremity of the joint portion of the first metal piece thereinto by preplaced brazing with the extremity of the joint portion of the first metal piece inserted in the bore of the second metal piece, the present invention provides a method of brazing the metal pieces characterized in that the joint portion of the first metal piece is formed in its outer peripheral surface with a plurality of grooves extending axially of the first metal piece and arranged at a spacing circumferentially thereof, each of the grooves having one end extending to the outside of the bore of the second metal piece when the joint portion is inserted in the bore.

The present invention provides another method of brazing metal pieces, i.e., a first metal piece having a tubular joint portion of predetermined length at an end thereof and a second metal piece having a bore for inserting the extremity of the joint portion of the first metal piece thereinto, by preplaced brazing with the extremity of the joint portion of the first metal piece inserted in the bore of the second metal piece, the method being characterized in that the second metal piece has an inner peripheral surface defining the bore and formed with a plurality of grooves extending from an open end of the second metal piece axially thereof and arranged at a spacing circumferentially thereof.

In the two methods of the present invention described above, the gas or residue of flux produced during brazing escapes through the grooves to the outside. This prevents voids or like defects from occurring in the fillet of the brazed joint. Moreover, the grooves are all filled up with the brazing filler metal. Consequently, the brazed joint can be given a sufficient bond strength and prevented from permitting leakage therethrough.

The present invention will be described in greater detail with reference to the accompanying drawings.

DESCRIPTION OF THE PREFERRED EMBODIMENTS

Throughout the drawings, like parts are designated by like reference numerals and will not be described repeatedly.

Figure 5:
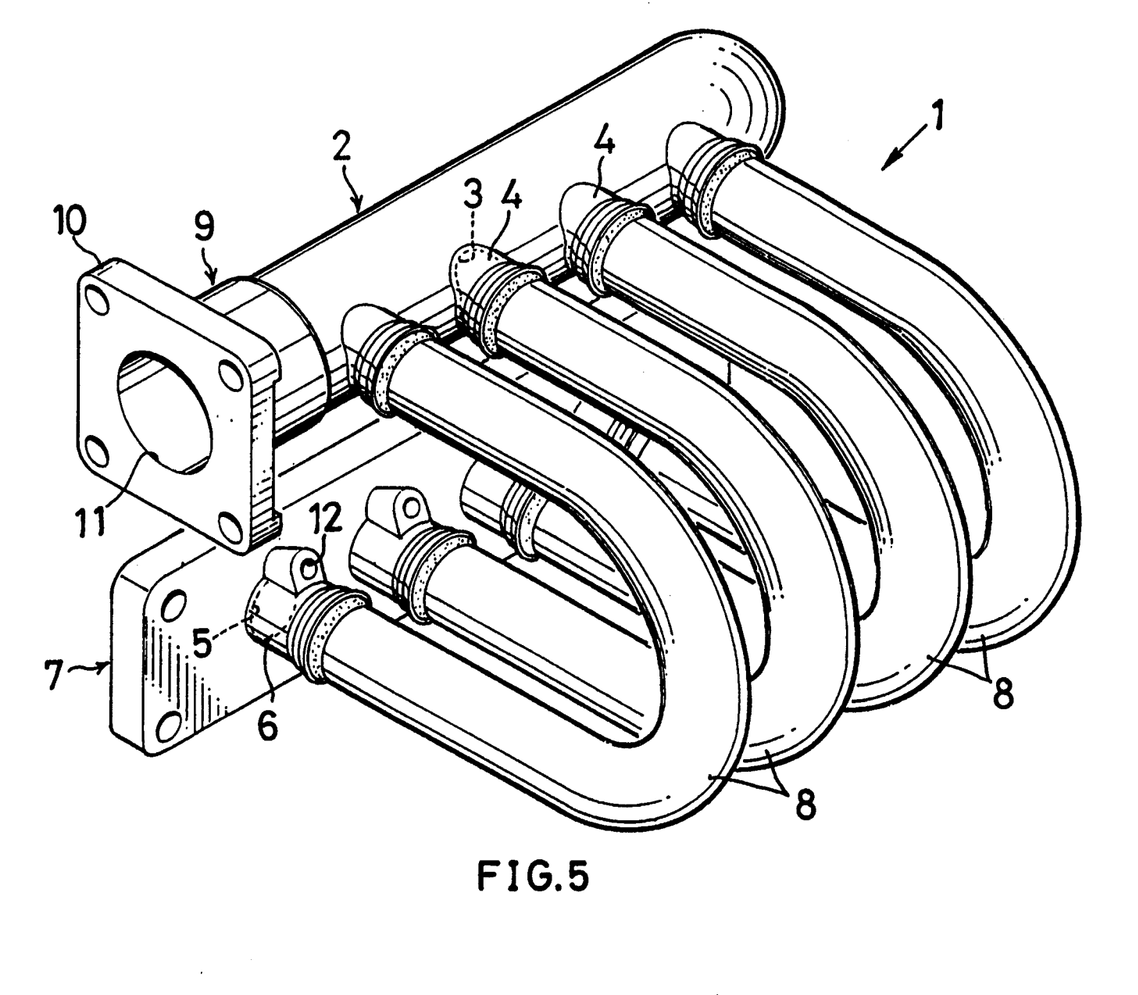
FIG. 5 is a perspective view of the intake manifold prepared using the method of the invention as the first embodiment.

PIG. 5 shows a motor vehicle intake manifold prepared with use of a method of the invention. The intake manifold 1 comprises a tubular plenum chamber 2 made of wrought aluminum or cast aluminum, a connection member 7 made of an aluminum casting and to be attached to a cylinder head, and branch pipes 8 made of wrought aluminum. The plenum chamber 2 has an open end, a closed end and a peripheral wall having a plurality of holes 3 and integral with cylindrical outer projections 4. The projections are provided around the respective holes 3 and adapted to be joined to the respective branch pipes 8. The connection member 7 is in the form of a laterally elongated rectangular plate, has holes 5 equal in number to the number of holes 3 of the plenum chamber 2 and is integral with cylindrical outer projections 6 formed around the respective holes 5 and joined to the respective branch pipes 8. The branch pipes 8 are equal in number to the number of holes 3 or 5 and each have one end fitted in and brazed to the outer projection 4 of the plenum chamber 2 and the other end fitted in and brazed to the outer projection 6 of the connection member 7.

With the intake manifold 1, it is desirable that the plenum chamber 2 and the branch pipes 8 be made of an aluminum material of JIS A6000 series, such as JIS S6063 or JIS A6061. A throttle body mount 9 of aluminum casting is brazed to the open end of the plenum chamber 2. When the plenum chamber 2 is made of casting, the throttle body mount 9 may be cast integrally therewith. The mount 9 is in the form of a cylinder having an outer flange 10 integral with one end thereof. The open end of the plenum chamber 2 is brazed to the mount 9, as inserted in the bore 11 of the mount 9. A throttle body (not shown) is attached to the mount 9, and an air duct from an air cleaner is connected thereto. The cylindrical outer projection 6 of the connection member 7 is integrally provided on its upper portion with a socket 12 for a fuel injector. Each of the branch pipes 8 is connected to an unillustrated engine cylinder head by the connection member 7.

A method of the present invention is used, for example, for brazing each branch pipe 8 to the cylindrical outer projection 4 of the plenum chamber 2 and to the cylindrical outer projection 6 of the connection member 7.

Next, the process for preparing the intake manifold 1 will be described with reference to FIGS. 1 to 4.

Figure 1:
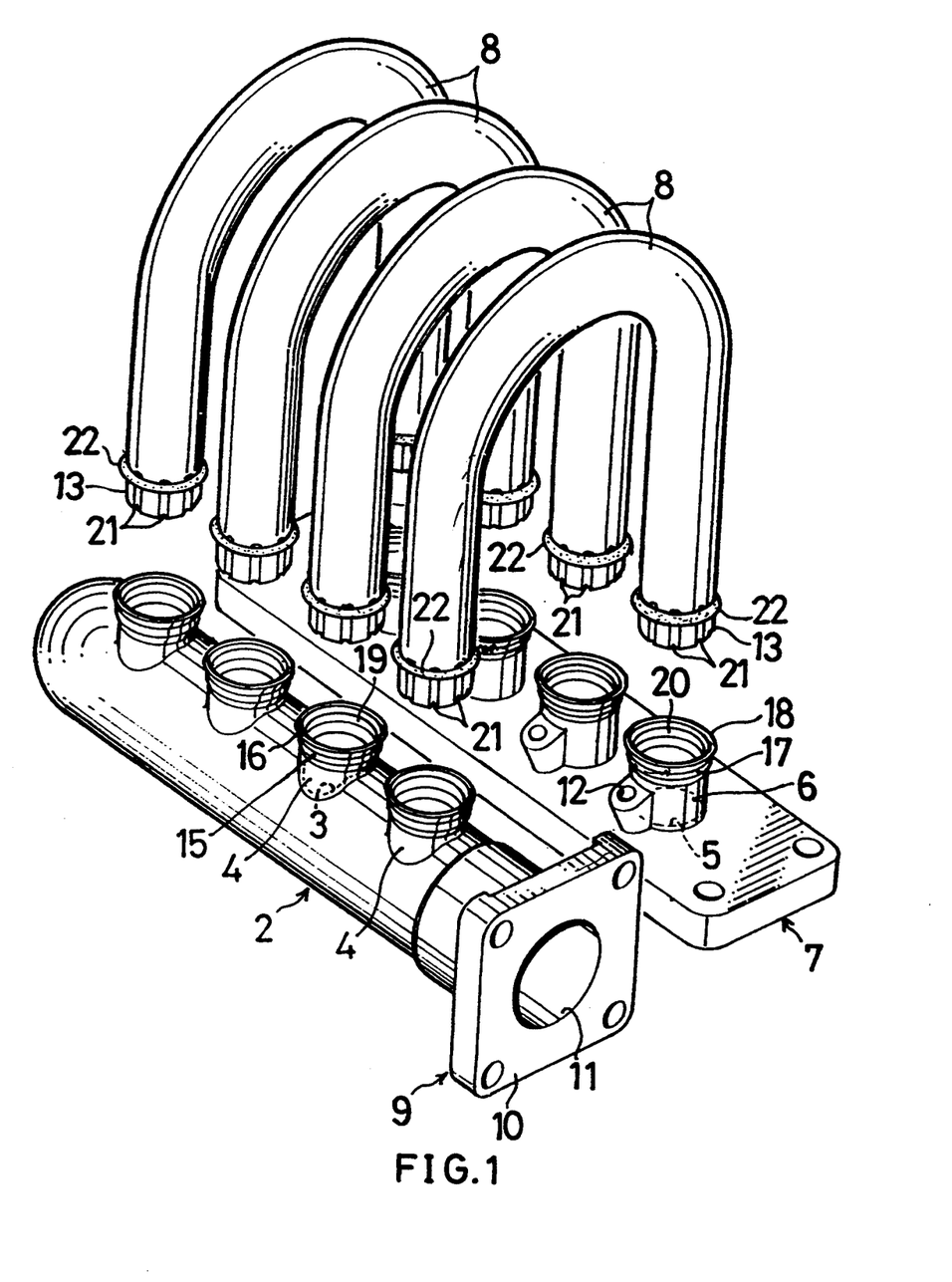
FIG. 1 is an exploded perspective view showing a first embodiment wherein a method of the invention is used for assembling an intake manifold, i.e., for brazing branch pipes to a plenum chamber and a connection member to be attached to a cylinder head, the embodiment being shown before brazing.
Figure 2:
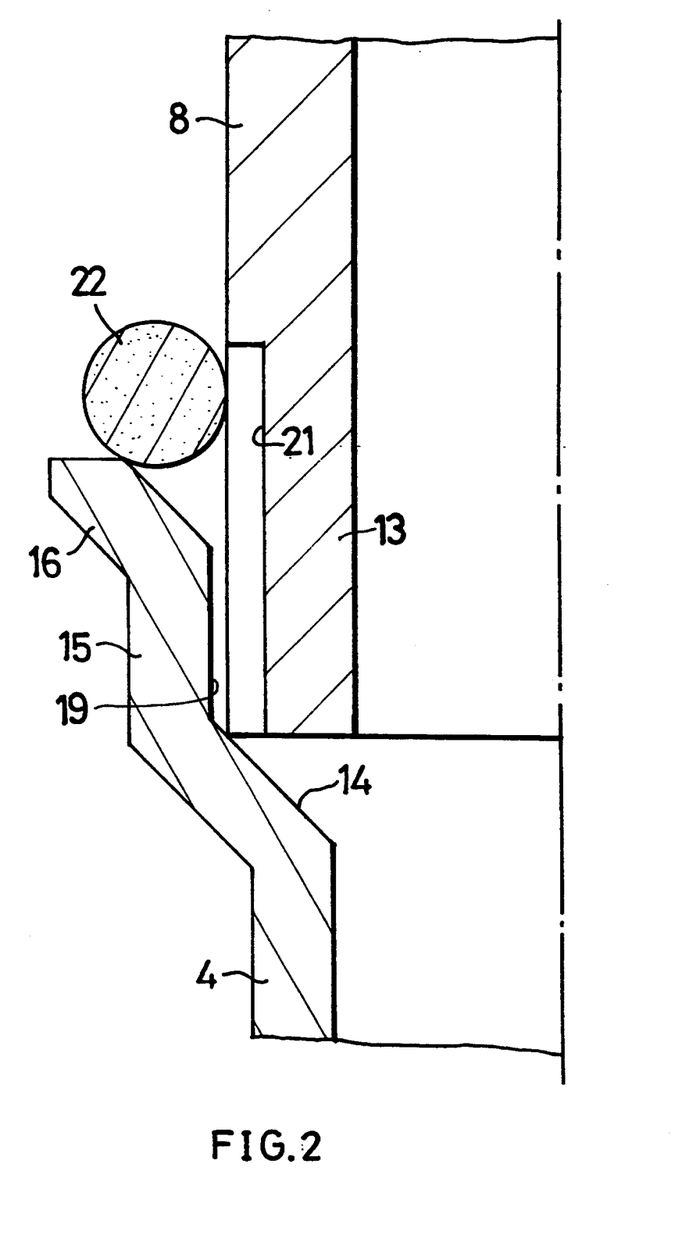
FIG. 2 is an enlarged view in vertical section of the first embodiment to show the extremity of a joint portion of the intake manifold branch pipe as inserted in a cylindrical outer projection of the plenum chamber before brazing.
Figure 3:
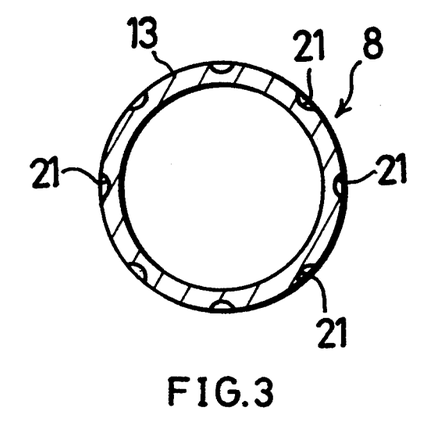
FIG. 3 is a cross sectional view of the branch pipe joint portion of the first embodiment.

First, straight joint portions 13, each having a predetermined length, to be joined to the plenum chamber 2 and the connection member 7 are formed at the respective ends of the branch pipe 8. On the other hand, a stepped portion 14 and an enlarged tubular portion 15 extending outward therefrom are formed in the outer end of the outer projection 4 of the plenum chamber 2, and the extremity of the portion 15 is flared to form a flare 16 spreading outward axially thereof. Similarly, an enlarged tubular portion 17 and a flare 18 are formed in the outer end of the outer projection 6 of the connection member 7. The inner surface of the enlarged tubular portion 15 (17) of each outer projection 4 (6) defines a circular bore 19 (20) for inserting the extremity of the joint portion 13 of the branch pipe 8 thereinto. The joint portion 13 at each end of the branch pipe 8 to be joined to the cylindrical outer projection 4 (6) of the plenum chamber 2 (the connection member 7) is formed in its outer peripheral surface with a plurality of grooves 21 arranged at a spacing in the circumferential direction and axially extending from the extremity thereof. Each of the grooves 21 has one end extending to the outside of the outer projection 4 (6) when the joint portion 13 is inserted in the circular bore 19 (20) of the enlarged tubular portion 15 (17) of the outer projection 4 (6).

Preferably, the grooves 21 are 0.3 to 1.5 mm in depth, and the spacing between the grooves 21 adjacent to each other in the circumferential direction is 5 to 30 mm. The depth of the grooves 21 is 0.3 to 1.5 mm because if it is less than 0.3 mm, the gas or the residue of the flux resulting from brazing will not fully escape and further because if it is in excess of 1.5 mm, the grooves 21 will not be fully filled up with the amount of brazing filler metal used, possibly entailing an insufficient bond strength. More preferably, the grooves 21 are 0.5 to 1.0 mm in depth.

The spacing between the grooves 21 is 5 to 30 mm because if it is smaller than 5 mm, an increased number of grooves 21 will not be fully filled up with the amount of brazing filler metal used to result in an insufficient bond strength and further because when it is over 30 mm, the gas or the residue of the flux produced during brazing will not be satisfactorily released.

The grooves 21 are semicircular, trapezoidal or otherwise shaped in cross section. Preferably, the number of grooves 21 is about 4 to about 16.

The opposite ends of each branch pipe 8 are then inserted respectively into the circular bore 19 of the enlarged tubular portion 15 of the plenum chamber outer projection 4 and the circular bore 20 of the enlarged tubular portion 17 of the connection member outer projection 6. An annular piece of brazing filler metal 22 is fitted around a portion of the branch pipe 8 which portion is present outside each of the outer projections 4, 6.

Figure 4:
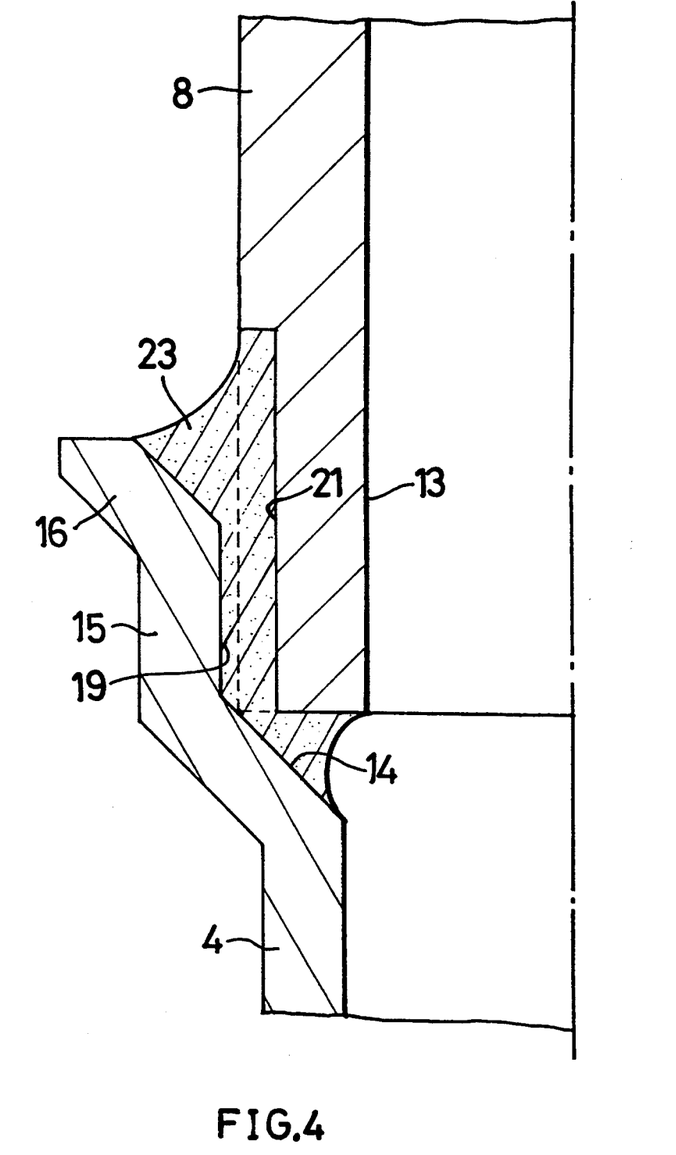
FIG. 4 is an enlarged view in vertical section of the first embodiment to show the branch pipe as brazed to the cylindrical outer projection of the intake manifold plenum chamber.

The open end of the plenum chamber 2 is inserted into the through bore 11 of the throttle body mount 9 at the end thereof opposite to the outer flange 10, and a ring of brazing filler metal (not shown) is fitted around the plenum chamber 2 at a portion thereof outside the bore 11. The resulting assembly in this state is then placed into a furnace with the outer projections 4, 6 and the joint portions 13 at the ends of the branch pipes 8 in a substantially vertical position to collectively braze the branch pipes 8 to the outer projections 4 of the plenum chamber 2 and the outer projections 6 of the connection member 7, and the plenum chamber 2 to the throttle body mount 9. Consequently, at each of the brazed joints between the outer projections 4, 6 and the joint portions 13 of the branch pipes 8, the grooves 21 act to form between the inner peripheral surface of the outer projection 4 (6) and the outer peripheral surface of the joint portion 13 of the branch pipe 8 a fillet 23 which is uniform over the entire circumference. As shown in FIG. 4, the fillet 23 is free from any void. Further since the brazing filler metal flows into the joint space through the grooves 21 on melting, the fillet 23 is present uniformly over the entire circumference also between the end face of the branch pipe 8 and the stepped portion 14.

Figure 6:
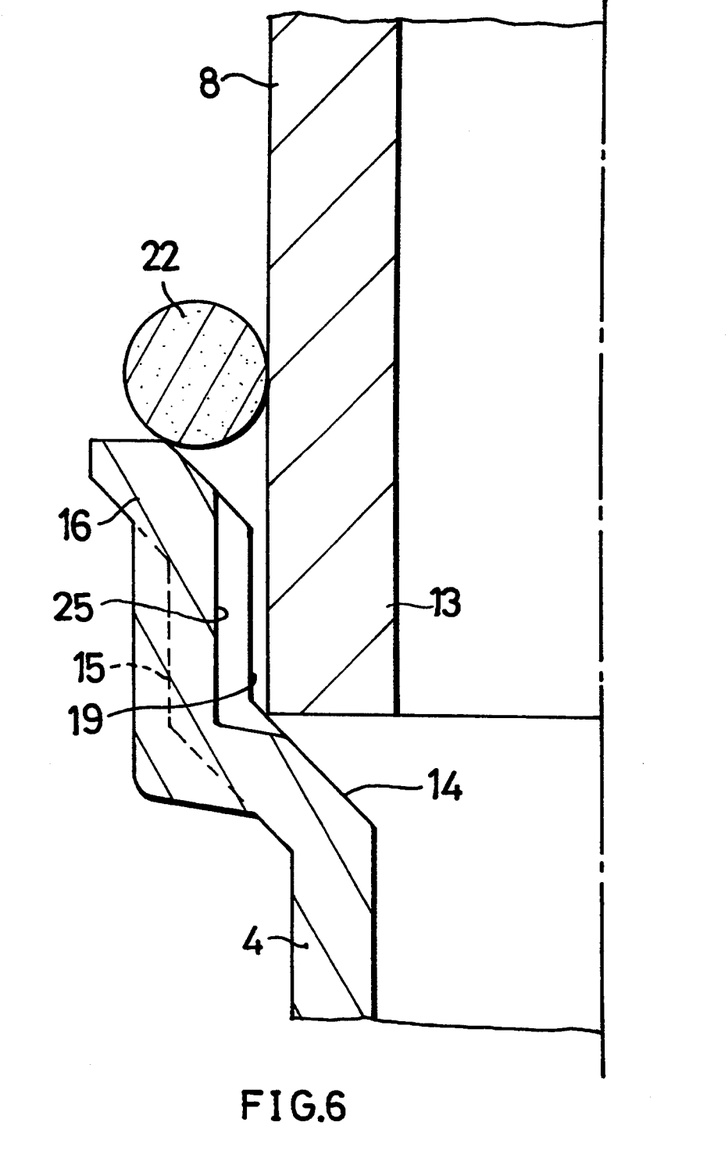
FIG. 6 is a view corresponding to FIG. 2 and showing a second embodiment of the invention.
Figure 7:
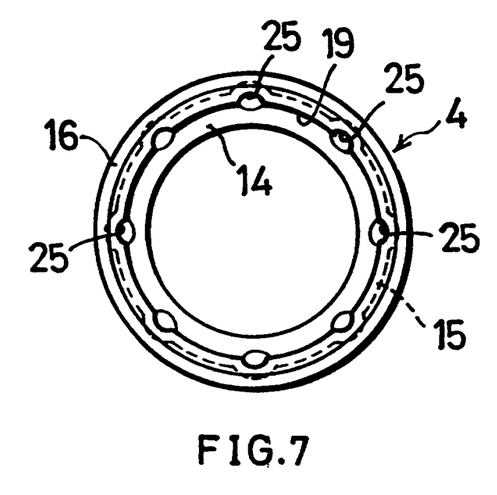
FIG. 7 is a plan view of the second embodiment to show a cylindrical outer projection.
Figure 8:
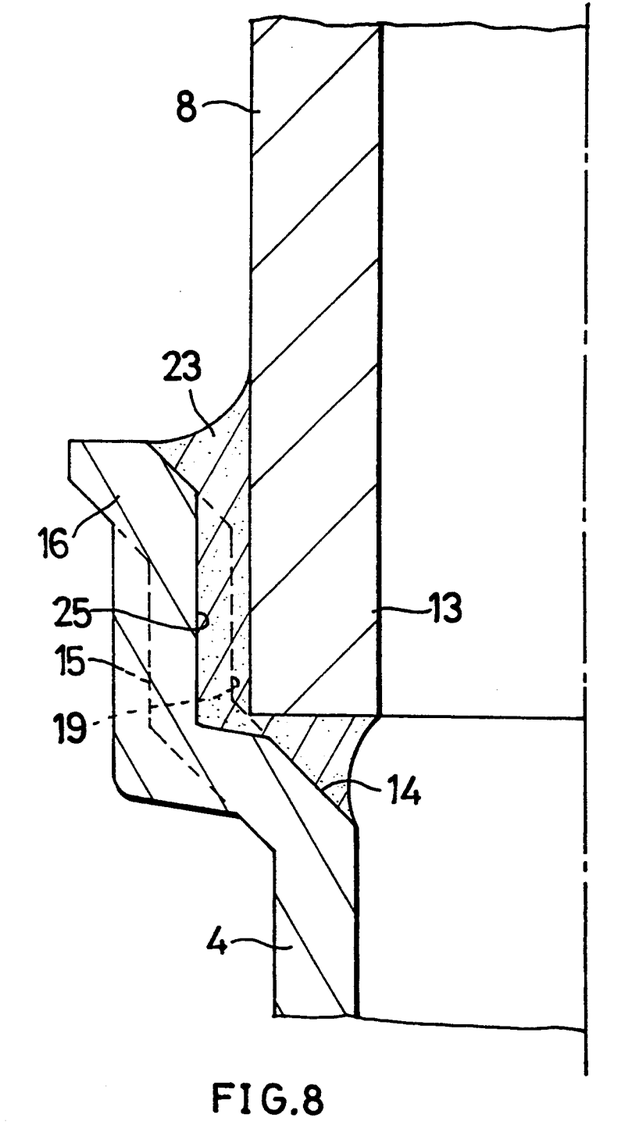
FIG. 8 is a view corresponding to FIG. 4 and showing the second embodiment.

FIGS. 6 to 8 show a second embodiment of the present invention. In this case, no grooves are formed in joint portions 13 at the respective ends of each branch pipe 8. An enlarged tubular portion 15 of each cylindrical outer projection 4 of a plenum chamber 2 has an inner peripheral surface defining a circular bore 19 and formed with a plurality of grooves 25. The grooves 25 extend axially of the portion 15, are arranged at a spacing circumferentially thereof and each have opposite ends slightly extending into a flare 16 and a stepped portion 14. Although not shown, an enlarged tubular portion 17 of each tubular outer peropjection 6 of a connection member 7 has an inner peripheral surface defining a circular bore 20 and also formed with a plurality of grooves. These grooves extend axially of the portion 16, are arranged at a spacing circumferentially thereof and each have opposite ends slightly extending into a flare 18 and a stepped portion. The parts are brazed in the same manner as in the first embodiment. The second embodiment is the same as the first embodiment with respect to the depth of grooves 25, spacing between the adjacent grooves 25 and number of grooves 25.

The configuration of the intake manifold described is not limitative. Stated more specifically, the shape of the plenum chamber, the position of the holes therein, the shape of the branch pipes, the shape of the connection member, the position of the holes therein, etc. are not limited to those illustrated but can be altered suitably.

EXAMPLE

An example is given below which is according to the first embodiment of the invention.

Figure 9:
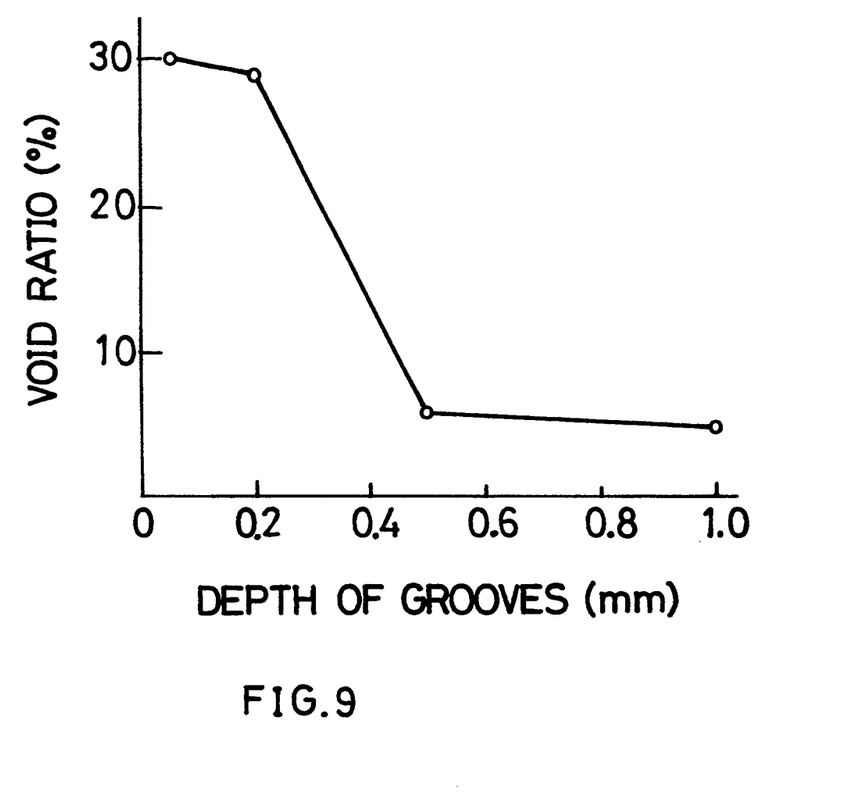
FIG. 9 is a graph showing the result of an example.

Branch pipes 8 were prepared which were 39 mm in outside diameter and 2 mm in the thickness of its peripheral wall. Eight grooves 21, 10 mm in length, were formed in the outer peripheral surface of the joint portion 13 at each end of the branch pipe 8, as arranged at equal spacings in the circumferential direction. Plenum chambers 2 and connection members 7 with cylindrical outer projections 4, 6 were prepared wherein the circular bores 19, 20 inside enlarged tubular portions 15, 17 were 4 mm in axial length, and flares 16, 18 were 2 mm in axial length. The parts were assembled into intake manifolds by brazing with the grooves 21 given varying depths to determine the void ratio. FIG. 9 shows the result.

With the two embodiments described above, the branch pipes are brazed to the plenum chamber and the connection member so that the joint portions and the circular bores assume a vertical position, whereas the methods of the invention are usable also when these joint and bored portions are inclined at an angle of up to 45 degrees with respect to the vertical position. Although the method of the invention is used for brazing the branch pipes of the motor vehicle intake manifold to the plenum chamber and cylinder head connection member thereof with the two embodiments described, these embodiments are not limitative. The method of the invention can be employed also for brazing parts of other articles such as heat exchangers.

What is claimed is:

1. A method of brazing together a joint, comprising the steps of:

providing a first metal piece having a tubular joint portion of predetermined length at an end thereof and a second metal piece having a bore for inserting the extremity of the joint portion of the first metal piece thereinto, wherein the first metal piece is the branch pipe of an intake manifold, and the second metal piece is the plenum chamber of the intake manifold or the connection member thereof to be attached to a cylinder head;

providing preplaced brazing on the extremity of the joint portion of the first metal piece which is inserted in the bore of the second metal piece;

providing the joint portion of the first metal piece on its outer peripheral surface with a plurality of grooves which extend axially of the first metal piece and which are arranged at a spacing circumferentially thereof, each of the grooves having one end extending to the outside of the bore of the second metal piece when the joint portion is inserted in the bore; and heating the joint to braze the joint together.

2. The method as defined in claim 1, wherein the grooves are provided 0.3 to 1.5 mm in depth, and the grooves adjacent to each other in the circumferential direction are provided spaced apart by 5 to 30 mm.

3. The method as defined in claim 2, wherein the grooves are provided 0.5 to 1.0 mm in depth.

4. The method as defined in claim 1, wherein the first metal piece and the second metal piece are provided made of aluminum.

5. The method as defined in claim 1, wherein the two metal pieces are so brazed that the joint portion of the first metal piece and the bore of the second metal piece assume a posture between a vertical position and a position inclined at 45 degrees with respect to the vertical position.

6. A method of brazing together a joint, comprising the steps of:

providing a first metal piece having a tubular joint portion of predetermined length at an end thereof and a second metal piece having a bore for inserting the extremity of the joint portion of the first metal piece thereinto, wherein the first metal piece is the branch pipe of an intake manifold, and the second metal piece is the plenum chamber of the intake manifold or the connection member thereof to be attached to a cylinder head;

providing preplaced brazing on the extremity of the joint portion of the first metal piece which is inserted in the bore of the second metal piece;

providing the second metal piece with an inner peripheral surface defining the bore and formed with a plurality of grooves extending axially from an open end of the second metal piece and arranged at a spacing circumferentially thereof; and heating the joint to braze the joint together.

7. The method as defined in claim 6 wherein the grooves are provided 0.3 to 1.5 mm in depth, and the grooves adjacent to each other in the circumferential direction are provided spaced apart by 5 to 30 mm.

8. The method as defined in claim 7 wherein the grooves are provided 0.5 to 1.0 mm in depth.

9. The method as defined in claim 6 wherein the first metal piece and the second metal piece are provided made of aluminum.

10. The method as defined in claim 6 wherein the two metal pieces are so brazed that the joint portion of the first metal piece and the bore of the second metal piece assume a posture between a vertical position inclined at 45 degrees with respect to the vertical position.

* * * * *